US010054457B2

(12) United States Patent
Takahara

(10) Patent No.: US 10,054,457 B2
(45) Date of Patent: Aug. 21, 2018

(54) DRIVING ASSISTANCE SYSTEM, METHOD, AND PROGRAM FOR A VEHICLE

(71) Applicant: AISIN AW CO., LTD., Anjo-shi, Aichi-ken (JP)

(72) Inventor: Masatoshi Takahara, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/124,539

(22) PCT Filed: Feb. 12, 2015

(86) PCT No.: PCT/JP2015/053734
§ 371 (c)(1),
(2) Date: Sep. 8, 2016

(87) PCT Pub. No.: WO2015/151594
PCT Pub. Date: Oct. 8, 2015

(65) Prior Publication Data
US 2017/0016737 A1 Jan. 19, 2017

(30) Foreign Application Priority Data
Mar. 31, 2014 (JP) .................. 2014-072263

(51) Int. Cl.
B60W 40/08 (2012.01)
B60W 40/09 (2012.01)
(Continued)

(52) U.S. Cl.
CPC ......... G01C 21/3484 (2013.01); B60W 40/08 (2013.01); B60W 40/09 (2013.01);
(Continued)

(58) Field of Classification Search
CPC ............... B60W 40/09; G01C 21/3484; G01C 21/3492; G01C 21/3691; G08G 1/0129;
(Continued)

(56) References Cited

U.S. PATENT DOCUMENTS 6,418,371 B1 * 7/2002 Arnold .................... G08G 1/08
340/905
2009/0082917 A1 3/2009 Adachi
(Continued)

FOREIGN PATENT DOCUMENTS

JP 2007-109001 A 4/2007
JP 2007109001 A * 4/2007
(Continued)

OTHER PUBLICATIONS

May 19, 2015 Search Report issued in International Patent Application No. PCT/JP2015/053734.
(Continued)

Primary Examiner — Charles J Han
(74) Attorney, Agent, or Firm — Oliff PLC

(57) ABSTRACT

Driving assistance systems, methods, and programs for a vehicle, acquire a travel history of a vehicle, acquire a guidance target point at which a guidance target event has occurred based on the travel history, and acquire a tendency of a driving operation of a driver of the vehicle based on the travel history. The systems, methods, and programs determine whether to provide guidance on the guidance target point based on the tendency of the driving operation, and provide guidance relating to the guidance target point for which it is determined to provide the guidance.

9 Claims, 2 Drawing Sheets

(51) Int. Cl.
*B60W 40/10* (2012.01)
*G08G 1/01* (2006.01)
*G08G 1/09* (2006.01)
*G08G 1/0967* (2006.01)
*G08G 1/048* (2006.01)
*G01C 21/34* (2006.01)
*G08G 1/16* (2006.01)
*G01C 21/36* (2006.01)
*G08G 1/0968* (2006.01)

(52) U.S. Cl.
CPC ......... *B60W 40/10* (2013.01); *G01C 21/3492* (2013.01); *G01C 21/3691* (2013.01); *G08G 1/0112* (2013.01); *G08G 1/0129* (2013.01); *G08G 1/0141* (2013.01); *G08G 1/048* (2013.01); *G08G 1/093* (2013.01); *G08G 1/096716* (2013.01); *G08G 1/096741* (2013.01); *G08G 1/096775* (2013.01); *G08G 1/096855* (2013.01); *G08G 1/16* (2013.01)

(58) Field of Classification Search
CPC ...... G08G 1/0141; G08G 1/048; G08G 1/093; G08G 1/096741; G08G 1/096855
See application file for complete search history.

(56) References Cited

U.S. PATENT DOCUMENTS

| | | | |
|---|---|---|---|
| 2010/0274435 A1* | 10/2010 | Kondoh | B60W 40/09 701/31.4 |
| 2012/0029801 A1 | 2/2012 | Yano et al. | |
| 2012/0197522 A1* | 8/2012 | Fukuhara | G01C 21/3641 701/424 |
| 2013/0204460 A1 | 8/2013 | Uno | |
| 2014/0088815 A1 | 3/2014 | Kitagishi et al. | |
| 2015/0073658 A1* | 3/2015 | Stoof | B60G 17/06 701/37 |

FOREIGN PATENT DOCUMENTS

| | | |
|---|---|---|
| JP | 2007-323281 A | 12/2007 |
| JP | 2011-118601 A | 6/2011 |
| JP | 2012-048310 A | 3/2012 |
| JP | 2012048310 A * | 3/2012 |

OTHER PUBLICATIONS

Mar. 24, 2017 Supplementary Search Report issued in European Patent Application No. 15773420.3.

* cited by examiner

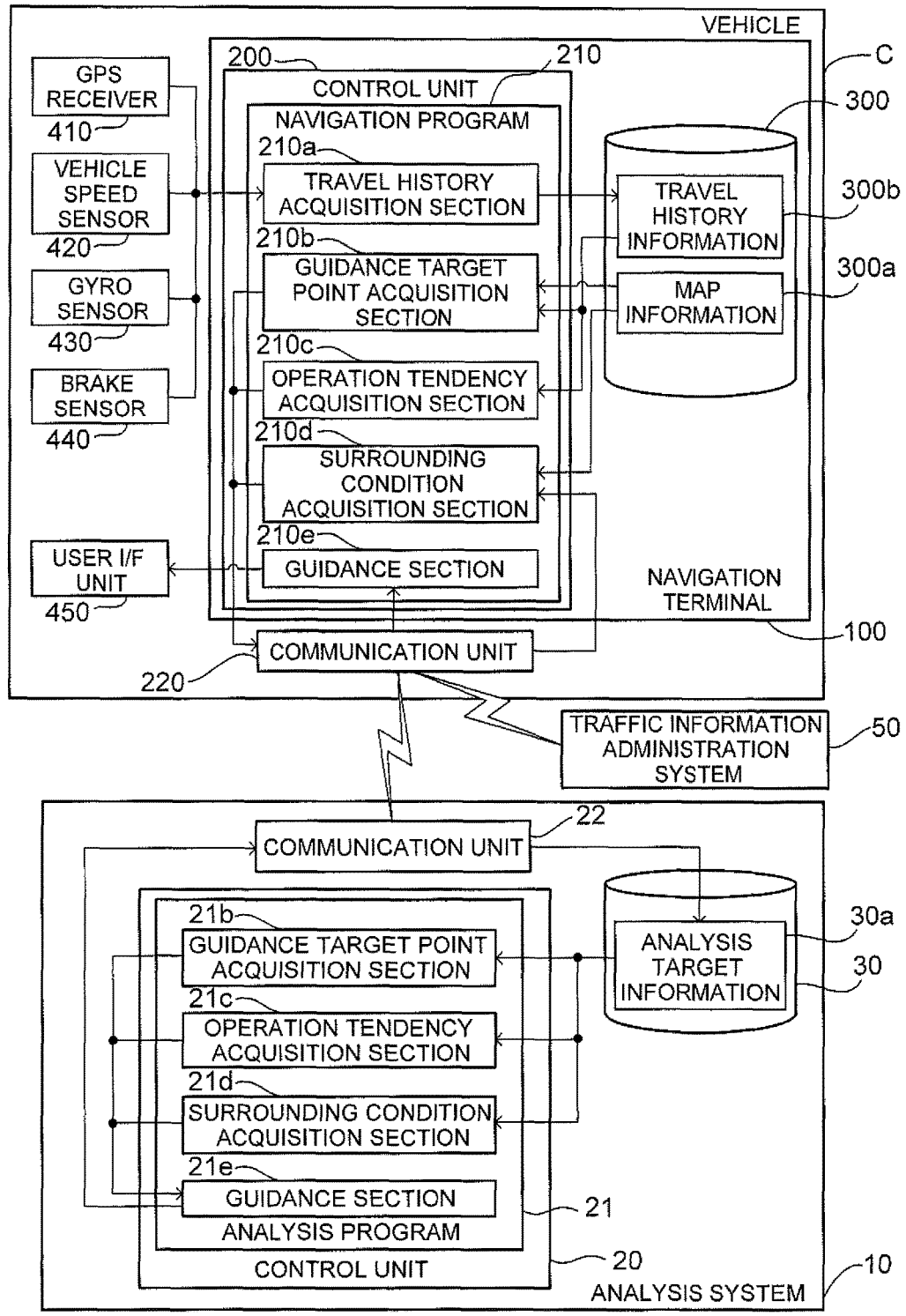

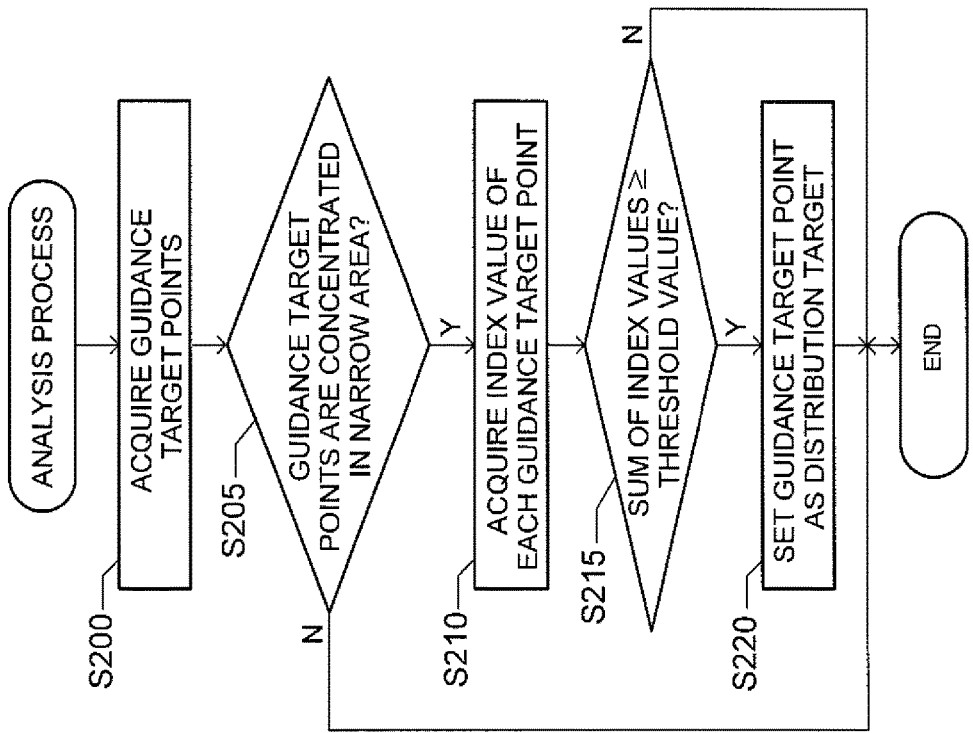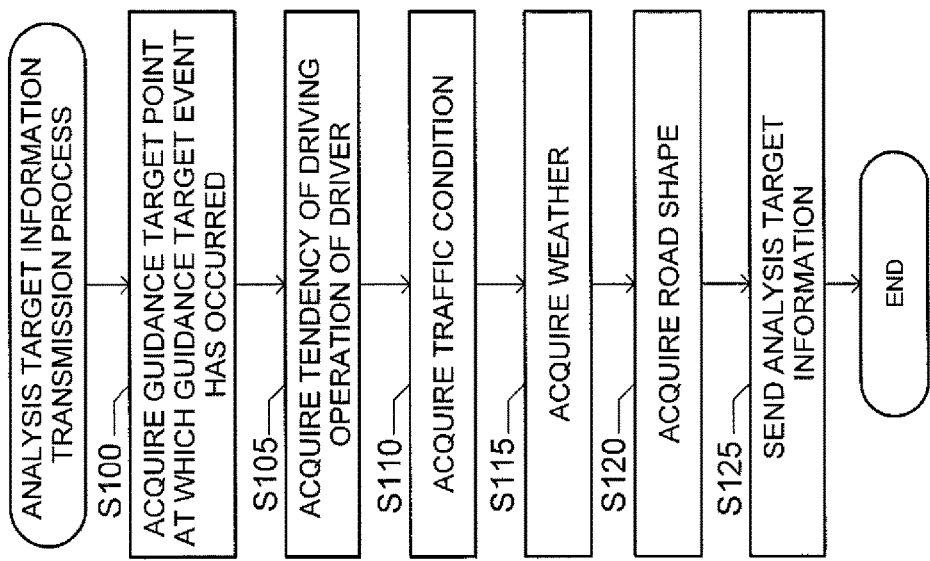

DRIVING ASSISTANCE SYSTEM, METHOD, AND PROGRAM FOR A VEHICLE

TECHNICAL FIELD

Related technological fields include technologies for providing guidance to call user's attention to driving.

BACKGROUND ART

Conventionally, there have been known a technology that determines a point to provide a warning, etc., based on a behavior of a vehicle on a road. For example, Japanese Patent Application Publication No. 2007-323281 discloses a technology that, when it is predicted that an operation to be performed in an emergency has occurred, in a case in which it is determined that the operation is likely to have been performed in an actual emergency in consideration of conditions regarding traffic regulation information of a road and a situation in a vicinity of the vehicle, collects the point at which the operation has occurred.

SUMMARY

In a conventional technique, guidance regarding the collected point is not always useful because tendency of a driving operation of a driver is not considered. That is, even when an emergent operation was conducted on a vehicle at a certain point, in a case in which a driver of the vehicle frequently conducts the emergent operation, another driver may not conduct the emergent operation at the point. Consequently, if guidance is provided at the point in such a case, guidance on information that is not useful for many drivers is provided, thereby giving the drivers a troublesome feeling. On the other hand, in a case in which a driver of the vehicle rarely conducts the emergent operation, it is likely that an event to which attention should be drawn at the point has occurred. Consequently, if guidance is provided at the point in such a case, guidance on information that is useful for many drivers is provided.

In light of the problems described above, it is an object of exemplary embodiments of the broad inventive principles described herein to provide a technology that is capable of selecting information to provide depending on a tendency of a driving operation of a driver.

In order to achieve the aforementioned object, exemplary embodiments provide driving assistance systems, methods, and programs for a vehicle that acquire a travel history of a vehicle, acquire a guidance target point at which a guidance target event has occurred based on the travel history, and acquire a tendency of a driving operation of a driver of the vehicle based on the travel history. The systems, methods, and programs determine whether to provide guidance on the guidance target point based on the tendency of the driving operation, and provide guidance relating to the guidance target point for which it is determined to provide the guidance.

As described above, the driving assistance system, the method, and the program determine whether to provide the guidance on the guidance target point based on the tendency of the driving operation. That is, depending on the tendency of the driving operation of the driver of the vehicle, the usefulness in providing the guidance on the guidance target point that is determined based on the travel history of the vehicle to a driver of another vehicle varies. Consequently, by determining whether to provide the guidance on the guidance target point based on the tendency of the driving operation, it is possible to select information to provide in accordance with the usefulness of the guidance corresponding to the tendency of the driving operation of the driver.

BRIEF DESCRIPTION OF THE DRAWINGS

FIG. 1 is a block diagram of a driving assistance system.
FIG. 2A shows a flowchart of an analysis target information transmission process.
FIG. 2B is a flowchart of an analysis process.

DETAILED DESCRIPTION OF EXEMPLARY EMBODIMENTS

Here, an embodiment will be explained in the following order.
(1) Configuration of driving assistance system:
(1-1) Configuration 1 of navigation terminal:
(1-2) Configuration of analysis system:
(1-3) Configuration 2 of navigation terminal
(2) Analysis target information transmission process:
(3) Analysis process:
(4) Other embodiments:

(1) Configuration of Driving Assistance System

FIG. 1 is a block diagram showing configuration of a driving assistance system according to the present embodiment. The driving assistance system according to the present embodiment is realized by an analysis system 10 and a navigation terminal 100 provided in a vehicle C. The navigation terminal 100 provides guidance relating to a guidance target point with a user I/F unit 450 based on analysis results by the analysis system 10.

(1-1) Configuration 1 of Navigation Terminal:

The navigation terminal 100 is mounted on a plurality of vehicles C traveling on roads. The navigation terminal 100 is provided with a control unit 200 including a CPU, a RAM, a ROM, etc. and a storage medium 300, and is capable of executing programs stored in the storage medium 300 and the ROM with the control unit 200. (As used herein, the term "storage medium" is not intended to encompass transitory signals.) The control unit 200 in the present embodiment is capable of executing a navigation program 210 as one of the programs.

The vehicle C is provided with a communication unit 220, a GPS receiver 410, a vehicle speed sensor 420, a gyro sensor 430, a brake sensor 440, and a user I/F unit 450. The communication unit 220 is configured as a circuit for performing radio communication. The control unit 200 is capable of controlling the communication unit 220 to perform communication with the analysis system 10 and a traffic information administration system 50.

In the present embodiment, the traffic information administration system 50 administrates information indicating a traffic condition for each road section. That is, the traffic information administration system 50 executes a process to acquire, as traffic conditions, a current congestion degree (not congested or congested), presence/absence of accidents, present/absence of constructions for each road section. When the vehicle C provides a transmission request for the traffic condition of a certain road section, the traffic information administration system 50 sends back the traffic condition of the requested road section. In addition, the traffic information administration system 50 executes a process to create information indicating current weather (sunny, cloudy, raining, snowing, strong wind, etc.) for each of predetermined sections. When the vehicle C provides a transmission request for the weather of a certain section, the traffic information administration system 50 sends back the weather of the requested section.

The GPS receiver 410 receives electronic waves from a GPS satellite and outputs signals for calculating a current position of the vehicle C through an interface (not shown). The control unit 200 acquires these signals to acquire the current position of the vehicle C. The vehicle speed sensor 420 outputs signals corresponding to a rotation speed of wheels provided on the vehicle C. The control unit 200 acquires these signals through an interface (not shown) to acquire the vehicle speed. The gyro sensor 430 detects angular acceleration for a turn in a horizontal plane of the vehicle C and outputs signals corresponding to the direction of the vehicle C. The control unit 200 acquires these signals to acquire a travel direction of the vehicle C. The vehicle speed sensor 420 and the gyro sensor 430, etc. are utilized to determine travel track of the vehicle C. In the present embodiment, the current position is determined based on a start point and the travel track of the vehicle C, and the current position of the vehicle C determined based on the start point and the travel track is corrected based on output signals of the GPS receiver 410.

The storage medium 300 stores map information 300*a*. The map information 300*a* includes node data indicating positions, altitudes, etc. of nodes set to roads to be traveled by the vehicle C, shape interpolating data indicating positions, altitudes, etc. of shape interpolating points for determining shapes of road sections between nodes, link data indicating connection between nodes, facility data indicating attributes, positions, etc. of facilities that may be a destination of an expected travel route, etc. The control unit 200 is capable of determining the road shape based on the node data and the shape interpolating data indicated in the map information 300*a*.

The brake sensor 440 is a sensor that detects an amount by which a brake pedal is operated in the vehicle C. The user I/F unit 450 is an interface part for inputting an instruction of a user and supplying various kinds information to the user, and provided with a display part combined with an input part formed by a touch panel display (not shown) and an output part for output sound such as a speaker, etc. The control unit 200 is capable of displaying the current position of the vehicle C and a map of a vicinity of the current position on the user I/F unit 450 by a function of the navigation program 210. That is, the control unit 200 acquires the current position of the vehicle C and creates an image showing a map of the vicinity of the current position based on the map information 300*a* to output to the user I/F unit 450. As a result, the display part of the user I/F unit 450 displays the map including the current position.

In addition, the navigation program 210 is capable of causing the control unit 200 to realize a function of acquiring a travel history that is a history of behavior of the vehicle C in a process of travel of the vehicle C, a function of creating analysis target information based on the travel history, and a function of providing guidance relating to a guidance target point determined based on the analysis target information. Therefore, the navigation program 210 is provided with a travel history acquisition section 210*a*, a guidance target point acquisition section 210*b*, an operation tendency acquisition section 210*c*, a surrounding condition acquisition section 210*d*, and a guidance section 210*e*.

The travel history acquisition section 210*a* is a program module that causes the control unit 200 to realize a function of acquiring the travel history of the vehicle C. That is, the control unit 200 determines the current position of the vehicle C based on output signals of the GPS receiver 410, the vehicle speed sensor 420, and the gyro sensor 430. In addition, the control unit 200 acquires output information of the brake sensor 440 at the current position, associates information indicating the current position with the output information of the brake sensor 440, and records the information as travel history information 300*b* in the storage medium 300. As the result, an operation condition of a brake for each point is recorded as the travel history information 300*b* as needed.

The guidance target point acquisition section 210*b* is a program module that causes the control unit 200 to realize a function of acquiring a guidance target point at which a guidance target event has occurred based on the travel history information 300*b*. In the present embodiment, it is previously defined that a sudden brake operation is the guidance target event. The control unit 200 refers to the storage medium 300 and extracts information indicating an operation of which an operation amount on the brake pedal per unit time is equal to or greater than a threshold value from the travel history information 300*b*. The control unit 200 acquires a position associated with the information indicating an operation amount corresponding to the sudden deceleration as the guidance target point.

The operation tendency acquisition section 210*c* is a program module that causes the control unit 200 to realize a function of acquiring a tendency of a driving operation of a driver of the vehicle C based on the travel history information 300*b*. In the present embodiment, the guidance target event is the sudden brake operation. Therefore, as an element to determine whether the guidance is useful for drivers of other vehicles C in a case in which the guidance on the guidance target point is provided, the control unit 200 acquires the tendency of the sudden brake operation as the tendency of the driving operation.

More specifically, in a case in which a sudden brake operation has occurred on the vehicle C that is driven by a driver with a high driving technique, the control unit 200 assumes that it is useful for many drivers that the guidance on the occurring point of the sudden brake operation is provided. In a case in which a sudden brake operation has occurred on the vehicle C that is driven by a driver with a low driving technique, the control unit 200 assumes that it is not useful that the guidance on the occurring point of the sudden brake operation is provided. Thus, the control unit 200 acquires a tendency of a driving technique of the driver of the vehicle as the tendency of the sudden brake operation. To that end, the control unit 200 refers to the travel history information 300*b* to acquire the occurrence frequency (time average, etc.) of the sudden brake operation with an operation amount on the brake pedal per travel history unit time that is equal to or greater than a threshold value. In addition, the control unit 200 compares the occurrence frequency with predetermined two threshold values, classifies a driving technique level into three levels of high, middle, and low, and acquires as the tendency of the driving technique.

The surrounding condition acquisition section 210*d* is a program module that causes the control unit 200 to realize a function of acquiring a surrounding condition of the vehicle C. That is, in a case in which the surrounding condition of the vehicle C is a special condition that may cause a sudden brake operation, even if the sudden brake operation has occurred under such a condition, the guidance target event may not occur under a normal condition. To that end, the control unit 200 acquires the surrounding condition of the vehicle C.

Specifically, the control unit 200 acquires, as the surrounding condition, a traffic condition of a road traveled by the vehicle C and the weather of the surrounding of the vehicle. That is, while it is possible to encourage an increase in security level if the guidance on the occurrence point of the sudden brake operation is provided, it is common that the sudden brake operation is less likely to occur as the traffic condition is a condition easier to travel on a road. In a case in which the sudden brake operation has occurred in a condition in which the sudden brake operation is less likely to occur, many drivers are required to pay attention to the occurrence of the same sudden brake operation. Therefore, the necessity of the guidance is high. On the other hand, in a case in which the sudden brake operation has occurred in a traffic condition in which the sudden brake operation is likely to occur, many drivers drive with attention even without any guidance. Therefore, the necessity of the guidance is low.

As mentioned above, the usefulness in providing the guidance on the guidance target point may vary depending on the traffic condition of the surrounding of the vehicle C. Thus, the control unit 200 controls the communication unit 220 to output a transmission request for the traffic condition in a road section, where the guidance target point acquired by the process of the guidance target point acquisition section 210*b* exists, to the traffic information administration system 50. As the result, the traffic information administration system 50 sends information indicating the traffic condition of the road section, where the guidance target point exists, to the vehicle C, and the control unit 200 acquires the sent traffic condition (the aforementioned congestion, etc.) as the surrounding condition of the vehicle C.

While it is possible to encourage an increase in security level if the guidance on the occurrence point of the sudden brake operation is provided, it is common that the sudden brake operation is less likely to occur as the weather is better. In a case in which the sudden brake operation has occurred in weather in which the sudden brake operation is less likely to occur, many drivers are required to pay attention to the occurrence of the same sudden brake operation. Therefore, the necessity of the guidance is high. On the other hand, in a case in which the sudden brake operation has occurred in weather in which the sudden brake operation is likely to occur, many drivers drive with attention even without any guidance. Therefore, the necessity of the guidance is low. The sudden brake operation that has occurred in special weather may not occur in other types of weather.

As mentioned above, the usefulness in providing the guidance on the guidance target point may vary depending on the weather of the surrounding of the vehicle C. Thus, the control unit 200 controls the communication unit 220 to output a transmission request for the weather in the section, where the guidance target point acquired by the process of the guidance target point acquisition section 210*b* exists, to the traffic information administration system 50. As the result, the traffic information administration system 50 sends information indicating the weather of the section, where the guidance target point exists, to the vehicle C, and the control unit 200 acquires the sent weather (the aforementioned sunny, etc.) as the surrounding condition of the vehicle C.

In addition, the sudden brake operation is likely to occur as the road shape is a road shape that causes a heavier operation load on the driver. Usually, the road shape does not change for a long period. Therefore, it is preferable for many users that the guidance on the road shape where the sudden brake operation is likely to occur is provided. Thus, the control unit 200 refers to the map information 300*a* and acquires the road shape of the road section, where the guidance target point acquired by the process of the guidance target point acquisition section 210*b* exists. Note that the road shape is only necessary to be previously classified in accordance with the occurrence probability of the sudden brake operation. In the present embodiment, the control unit 200 classifies the road shape of the road section into straight, shallow curve, and sharp curve based on a curvature of a road section indicated by the shape interpolating data and the node data. In addition, the control unit 200 refers to the node data and the link data, and in a case in which it is determined that an intersection corresponding to a front end of the road section is a merging point (an intersection impossible to be traveled in a straight direction), classifies the road shape of the road section as a merging point.

In the present embodiment, the analysis system 10 determines the guidance target point to provide the guidance in accordance with the tendency of the driving operation of the driver of the vehicle C and the surrounding condition of the vehicle C. To execute such an analysis, the control unit 200 sends analysis target information that will be a base of analysis to the analysis system 10. That is, the control unit 200, with the process of the navigation program 210, creates the analysis target information in which the guidance target point acquired by the guidance target point acquisition section 210*b*, the tendency of the driving technique (driving technique level) acquired by the operation tendency acquisition section 210*c*, and the surrounding condition (traffic condition, weather, and road shape) acquired by the surrounding condition acquisition section 210*d* are associated. In addition, the control unit 200, with the process of the navigation program 210, controls the communication unit 220 to send the analysis target information to the analysis system 10 at certain timing (for example, at regular intervals, upon a request from the driver).

(1-2) Configuration of Analysis System:

In the present embodiment, the analysis system 10 determines the guidance target point to provide guidance in accordance with the tendency of the driving operation of the driver of the vehicle C. The analysis system 10 is provided with a control unit 20 including a CPU, a RAM, a ROM, etc. and a storage medium 30, and is capable of executing programs stored in the storage medium 30 and the ROM. In addition, the analysis system 10 is provided with a communication unit 22. The communication unit 22 is configured as a circuit for performing radio communication. The control unit 20 controls the communication unit 22, performs radio communication with the vehicle C, acquires the analysis target information, and records the analysis target information as the analysis target information 30*a* in the storage medium 30.

The control unit 20 is capable of analyzing the analysis target information 30*a* by executing the analysis program 21. To execute the analysis, the analysis program 21 includes guidance target point acquisition section 21*b*, operation tendency acquisition section 21*c*, surrounding condition acquisition section 21*d*, and guidance section 21*e*.

The guidance target point acquisition section 21*b* is a program module that causes the control unit 20 to realize a function of acquiring a plurality of guidance target points existing in an area of a predetermined distance. That is, the control unit 20 refers to the analysis target information 30*a*, and in a case in which the guidance target points are concentrated in the area of the predetermined distance, predicts that the sudden brake operation at each guidance target point is caused by the same sudden deceleration factor. Then, the control unit 20 refers to the analysis target information 30a to acquire the plurality of guidance target points at which the sudden brake operation was performed by the same sudden deceleration factor.

The operation tendency acquisition section 21c is a program module that causes the control unit 20 to realize a function of acquiring an index indicating the tendency of the driving operation of the driver of the vehicle C for each of the plurality of guidance target points. That is, the control unit 20 acquires the tendency of the driving operation associated with each of the plurality of guidance target points acquired by the process of the guidance target point acquisition section 21b and acquires a value of the index corresponding to the tendency of the driving operation. In the present embodiment, the value of the index corresponding to the tendency of the driving operation is previously determined, and the control unit 20 acquires the value of the index based on correspondence relation that is previously determined.

Specifically, Table 1 indicates an example of values of the index corresponding to the tendency of the driving operation.

TABLE 1

Tendency of Driving Operation

| Driving Technique Level: Low | 0.2 |
|---|---|
| Driving Technique Level: Middle | 0.5 |
| Driving Technique Level: High | 1.0 |

The control unit 20 acquires the value of the index corresponding to the tendency (driving technique level) of the driving operation based on the correspondence relation that is thus previously determined for each guidance target point.

The surrounding condition acquisition section 21d is a program module that causes the control unit 20 to realize a function of acquiring an index indicating a surrounding condition of the vehicle C for each of the plurality of guidance target points. That is, the control unit 20 acquires the surrounding condition associated with each of the plurality of guidance target points acquired by the process of the guidance target point acquisition section 21b and acquires a value of the index corresponding to the surrounding condition. In the present embodiment, the value of the index corresponding to the surrounding condition is previously determined, and the control unit 20 acquires the value of the index based on correspondence relation that is previously determined.

Specifically, Table 2 indicates an example of values of the index corresponding to road shapes, Table 3 indicates an example of index corresponding to traffic conditions, and Table 4 indicates an example of index corresponding to weather.

TABLE 2

Road Shape

| Straight Line | 1.0 |
|---|---|
| Shallow Curve | 1.2 |
| Sharp Curve | 1.4 |
| Merging Point | 1.6 |

TABLE 3

Traffic Condition

| Construction | 0.5 |
|---|---|
| Accident | 0.5 |
| Congested | 0.8 |
| Not congested | 1.0 |

TABLE 4

Weather

| Strong Wind | 0.2 |
|---|---|
| Snowing | 0.2 |
| Raining | 0.6 |
| Sunny, Cloudy | 1.0 |

The control unit 20 acquires values of the index corresponding to the surrounding condition based on the correspondence relation that is thus previously determined for each guidance target point.

The guidance section 21e is a program module that causes the control unit 20 to realize a function of determining whether to provide the guidance on the guidance target point based on a sum of products of the index indicating the tendency of the driving operation and the index indicating the surrounding condition for each of the plurality of guidance target points.

That is, in a case in which a plurality of guidance target points exist in the area of the predetermined distance, it is likely to be useful to provide the guidance for the guidance target points and the usefulness becomes higher as the number of guidance target points increases. However, in a case in which many of the plurality of guidance target points are points acquired due to sudden brake operations of drivers with a low driving technique, the necessity to provide the guidance on the guidance target points is low. In addition, cases may occur, in which it was not useful to provide the guidance on the surrounding condition of the vehicle C for many of the plurality of guidance target points. Then, the control unit 20 comprehensively determines whether it is useful to provide the guidance for the plurality of guidance target points based on the sum of the products of the index indicating the tendency of the driving operation and the index indicating the surrounding condition Specifically, the control unit 20 acquires, for each guidance target point, the index indicating the tendency of the driving operation×(the index indicating the road shape+the index indicating the traffic condition+the index indicating the weather) and adds the acquired values to acquire the sum of the products of the index indicating the tendency of the driving operation and the index indicating the surrounding condition. In addition, in a case in which the sum is equal to or greater than a threshold value that is previously determined, the control unit 20 determines to provide the guidance for the guidance target points. The control unit 20 sets the guidance target points determined to provide the guidance as distribution target.

In the above process, the guidance section 21e makes a determination by increasing the probability at which it is determined to provide the guidance on the guidance target point as the tendency of the driving technique of the driver of the vehicle C is higher. That is, in the present embodiment, the value of the index indicating the tendency of the driving operation becomes larger as the driving technique level is higher, as shown in Table 1. Therefore, in a case in which the index indicating the surrounding condition of the vehicle C is set to a fixed value, the aforementioned sum for the guidance target points becomes larger as the driving technique level of the driver of the vehicle C is higher. Consequently, the probability, at which it is determined that the sum is equal to or greater than the aforementioned threshold value, increases.

The determination regarding the tendency of the driving operation as mentioned above is performed based on the fact that the possibility of performing the sudden brake operation is lower as the tendency of the driving technique is higher. That is, in a case in which the guidance target event has occurred even for drivers with a high driving technique, many drivers are required to pay attention to the occurrence of the same guidance target event. Consequently, by increasing the probability at which it is determined to provide the guidance on the guidance target point as the tendency of the driving technique is higher, it is possible to configure such that the guidance on information useful for many drivers is provided and the guidance on information unuseful for many drivers is not provided.

In addition, in the above process, the guidance section 21e makes a determination by increasing the probability at which it is determined to provide the guidance on the guidance target point as the traffic condition is easier to travel on the road. That is, in the present embodiment, the value of the index indicating the traffic condition becomes larger as the condition is easier to travel on the road (as operation load for the driver is smaller), as shown in Table 3. Therefore, in a case in which indexes other than the index indicating the traffic condition are set to fixed values, the aforementioned sum for the guidance target points becomes larger as the condition is easier to travel on the road. Consequently, the probability, at which it is determined that the sum is equal to or greater than the aforementioned threshold value, increases. As a result, it is possible to configure such that the guidance on information useful for many drivers is provided and the guidance on information unuseful for many drivers is not provided.

In addition, in the above process, the guidance section 21e makes a determination by increasing the probability at which it is determined to provide guidance on the guidance target point as the weather is better. That is, in the present embodiment, the value of the index indicating the weather becomes larger as the weather is better, as shown in Table 4. Therefore, in a case in which indexes other than the index indicating the weather is set to fixed values, the aforementioned sum for the guidance target points becomes larger as the weather is better. Consequently, the probability, at which it is determined that the sum is equal to or greater than the aforementioned threshold value, increases. As a result, it is possible to configure such that the guidance on information useful for many drivers is provided and the guidance on information unuseful for many drivers is not provided.

In addition, in the above process, the guidance section 21e makes a determination by increasing the probability at which it is determined to provide the guidance on the guidance target point as the road shape causes a larger operation load to the driver. That is, in the present embodiment, the value of the index indicating the road shape becomes larger as the road shape causes a larger operation load to the driver, as shown in Table 2. Therefore, in a case in which indexes other than the index indicating the road shape is set to fixed values, the aforementioned sum for the guidance target points becomes larger as the road shape causes a larger operation load to the driver. Consequently, the probability, at which it is determined that the sum is equal to or greater than the aforementioned threshold value, increases. As a result, it is possible to configure such that the guidance on information useful for many drivers is provided and the guidance on information unuseful for many drivers is not provided.

The surrounding condition in the present embodiment corresponds to the traffic condition, the weather, and the road shape. The traffic condition and the weather is a dynamic condition that can change in a short period of time. On the other hand, the road shape is a static condition that does not change unless a special situation such as reconstruction of roads occurs. Consequently, in the present embodiment, for the dynamic condition among the surrounding condition of the vehicle C, it is assumed that the necessity to provide guidance on the occurrence points of the sudden brake operation is low in case of a special condition. On the other hand, for the static condition among the surrounding condition of the vehicle C, it is assumed that the necessity to provide guidance on the occurrence points of the sudden brake operation is high in case of a special condition.

(1-3) Configuration 2 of navigation terminal:

As mentioned above, in a case in which the guidance target point is set as distribution target by the guidance section 21e, the control unit 20 distributes the information indicating the guidance target point in response to a transmission request from the vehicle C to cause the control unit 200 of the vehicle C to provide the guidance relating to the guidance target point. To provide the guidance, the navigation program 210 is provided with the guidance section 210e.

The guidance section 210e is a program module that causes the control unit 200 to realize a function of providing the guidance relating to the guidance target point for which it is determined to provide the guidance. That is, the control unit 200 is capable of performing a transmission request for the guidance target point at certain timing (for example, at regular intervals, or at a timing of the driver's request). When the transmission request is performed, the analysis system 10 distributes the information indicating the guidance target point.

When the information indicating the guidance target point is distributed, in the vehicle C, the control unit 200 acquires the information and records the acquired information in the storage medium 300, etc. In such a state, the control unit 200, with the process of the navigation program 210, determines a current position of the vehicle C based on the output signals of the GPS receiver 410, the vehicle speed sensor 420, and the gyro sensor 430. When the current position approaches the guidance target point, the control unit 200 provides the guidance to prevent the sudden brake operation at the guidance target point. That is, the control unit 200 outputs, to the user I/F unit 450, a control signal so as to provide the guidance indicating that the guidance target point is a point at which the sudden brake operation frequently occurs. As a result, an image indicating the point at which the sudden brake operation frequently occurs is displayed on the display part of the user I/F unit 450, and an audio indicating the point at which the sudden brake operation frequently occurs is output from the output part of the user I/F unit 450. With the above process, it is possible to provide the guidance to warn the driver of the vehicle C against an excess vehicle speed, etc. before arriving at the guidance target point.

According to the driving assistance system with the above configuration, under the assumption that the usefulness in providing the guidance on the guidance target point determined from the travel history of the vehicle C to the driver of another vehicle C varies depending on the tendency of the driving operation of the driver of the vehicle C and the surrounding condition of the vehicle C, it is possible to determine whether to provide the guidance on the guidance target point in accordance with the usefulness. Consequently, it is possible to select information to provide in accordance with the usefulness of the guidance.

(2) Analysis Target Information Transmission Process

Subsequently, an analysis target information transmission process that is executed by the control unit 200 with the navigation program 210 is explained in detail. FIG. 2A is a flowchart indicating the analysis target information transmission process. The analysis target information transmission process is executed under a condition in which the control unit 200, with the process of the travel history acquisition section 210a, acquires the travel history information 300b as needed while the vehicle C is traveling and records the acquired information in the storage medium 300.

In the analysis target information transmission process, the control unit 200, with the process of the guidance target point acquisition section 210b, acquires a guidance target point at which the guidance target event has occurred (Step S100). That is, the control unit 200 refers to the travel history information 300b and searches for information indicating a sudden brake operation of which an operation amount on the brake pedal per unit time is equal to or greater than a threshold value. Then, in a case in which an operation of which the operation amount on the brake pedal per unit time is equal to or greater than the threshold value is extracted, the control unit 200 acquires the point at which the operation amount is equal to or greater than the threshold value as the guidance target point. In a case in which the guidance target point is not acquired, the control unit 200 terminates the analysis target information transmission process.

In a case in which the guidance target point is acquired, the control unit 200, with the process of the operation tendency acquisition section 210c, acquires the tendency of the driving operation of the driver (Step S105). That is, the control unit 200 refers to the travel history information 300b and searches for information indicating an operation of which an operation amount on the brake pedal per unit time is equal to or greater than the threshold value. Then, in a case in which a sudden brake operation of which the operation amount on the brake pedal per unit time is equal to or greater than the threshold value is extracted, the control unit 200 acquires an occurrence frequency of the sudden brake operation. The occurrence frequency can be defined, for example, by acquiring a number of operation times per unit period of time by a division of a total number of occurrence times of the sudden brake operation by an entire period of time. The control unit 200 determines the driving technique level based on the occurrence frequency and acquires the determined driving technique level as the tendency of the driving operation.

Subsequently, the control unit 200, with the process of the surrounding condition acquisition section 210d, acquires the traffic condition (Step S110). That is, the control unit 200 outputs a transmission request to the traffic information administration system 50 so as to send the traffic condition of the road section in which the guidance target point acquired at Step S100 exists, and acquires the traffic condition of the road section sent back from the traffic information administration system 50.

Subsequently, the control unit 200, with the process of the surrounding condition acquisition section 210d, acquires the weather (Step S115). That is, the control unit 200 outputs a transmission request to the traffic information administration system 50 so as to send the weather of the section including the guidance target point acquired at Step S100, and acquires the weather of the section sent back from the traffic information administration system 50.

Subsequently, the control unit 200, with the process of the surrounding condition acquisition section 210d, acquires the road shape (Step S120). That is, the control unit 200 refers to the map information 300a and acquires the road shape of the road section in which the guidance target point acquired at Step S100 exists.

Subsequently, the control unit 200, with the process of the navigation program 210, sends analysis target information (Step S125). That is, the control unit 200 associates the guidance target point acquired at Step S100 with the tendency of the driving operation acquired at Step S105, the traffic condition acquired at Step S110, the weather acquired at Step S115, and the road shape acquired at Step S120 to make the analysis target information. In addition, the control unit 200 controls the communication unit 220 to send the analysis target information to the analysis system 10.

(3) Analysis Process

Subsequently, an analysis process executed by the control unit 20 with the analysis program 21 is explained in detail. FIG. 2B is a flowchart indicating the analysis process. The analysis process is executed at certain timing (for example, at regular intervals) under a condition that the analysis target information sent from the vehicle C is sequentially recorded in the storage medium 30. In the analysis process, the control unit 20, with the process of the guidance target point acquisition section 21b, acquires the guidance target points (Step S200). That is, the control unit 20 refers to the analysis target information 30a that is recorded in the storage medium 30 and acquires a plurality of guidance target points associated with respective pieces of the analysis target information 30a sent from a plurality of vehicles C.

Subsequently, the control unit 20, with the process of the guidance target point acquisition section 21b, determines whether the guidance target points are concentrated in a narrow area (Step S205). That is, in a case in which a predetermined number of the guidance target points or more are concentrated in an area of a predetermined distance, it is assumed that these guidance target points are points at which the sudden deceleration has been performed due to the same sudden deceleration factor. Then, the control unit 20 determines whether a region where a predetermined number of guidance target points or more exist in the area of the predetermined area exists. In a case in which such a region exists, the control unit 20 assumes that the guidance target points are concentrated in a narrow area.

At Step S205, in a case in which it is not determined that the guidance target points are concentrated in a narrow area, the control unit 20 terminates the analysis process. On the other hand, at Step S205, in a case in which it is determined that the guidance target points are concentrated in a narrow area, the control unit 20 acquires an index value for each guidance target point (Step S210). That is, the control unit 20 assumes the plurality of guidance target points for which it is determined to be concentrated in a narrow area at Step S205 as acquisition targets for index values. Then, the control unit 20, with the process of the operation tendency acquisition section 21c, determines the index values corresponding to the tendency of the driving operation associated with the guidance target points as acquisition targets from a defined relation in Table 1, etc.

In addition, the control unit 20, with the process of the surrounding condition acquisition section 21d, determines the index values corresponding to the road shapes associated with the guidance target points as acquisition targets from a defined relation of Table 2, etc. Further, the control unit 20, with the process of the surrounding condition acquisition section 21d, determines the index values corresponding to the traffic conditions associated with the guidance target points as acquisition targets from a defined relation of Table 3, etc. and determines the index values corresponding to the weather associated with the guidance target points as acquisition targets from a defined relation of Table 4, etc. Note that there is a case in which the road shape, the traffic condition, and the weather are assumed the same for all of the guidance target points as acquisition targets because the guidance target points as acquisition targets are concentrated in a narrow area. In such a case, for a single guidance target point, the index value corresponding to the traffic condition and the index value corresponding to the weather are acquired, and the same index values may be used for other guidance target points.

Subsequently, the control unit 20, with the process of the guidance section 21e, determines whether the sum of the index values is equal to or greater than a threshold value (Step S215). That is, the control unit 20, with the process of the guidance section 21e, performs, for each of the guidance target points as acquisition targets, a process of acquiring the sum of the index value corresponding to the road shape, the index value corresponding to the traffic condition, and the index value corresponding to the weather acquired at Step S210, and a process of multiplying the sum by the index value corresponding to the tendency of the driving operation acquired at Step S210. Further, the control unit 20 adds the values acquired for each of the guidance target points as acquisition targets to acquire the total sum of the index values. In a case in which the acquired total sum is equal to or greater than the threshold value, the control unit 20, with the process of the guidance section 21e, determines that the total sum of the index values is equal to or greater than the threshold value.

At Step S215, it is not determined that the total sum of the index values is equal to or greater than the threshold value, the control unit 20 terminates the analysis process. On the other hand, at Step S215, in a case in which it is determined that the total sum of the index values is equal to or greater than the threshold value, the control unit 20, with the process of the guidance section 21e, sets a guidance target point as distribution target (Step S220). That is, the control unit 20 determines the guidance target point as distribution target by a statistic process based on a plurality of guidance target points which are determined to be concentrated in a narrow area at Step S205. Examples of the statistic process include a process of setting a center of the plurality of guidance target points as the guidance target point as distribution target. In this state, the control unit 20 distributes the guidance target point as distribution target to the vehicle C in response to the distribution request from the vehicle C.

(4) Other Embodiments

The above embodiment is an example. Therefore, other kinds of embodiments may be adapted as long as whether to provide the guidance on the guidance target point is determined based on the tendency of the driving operation. For example, the navigation terminal 100 may be fixedly installed in a vehicle, or the navigation terminal 100 that is portable may be brought and used in the vehicle. In addition, at least a part of travel history acquisition means, guidance target point acquisition means, operation tendency acquisition means, surrounding condition acquisition means, and guidance means may be realized by a control body that is different from that in the aforementioned embodiment. For example, the respective sections may be located in only one of the navigation terminal 100 and the analysis system 10. In addition, the structure to detect the occurrence of sudden deceleration is not limited to the brake sensor 440. For example, the occurrence of sudden deceleration may be detected based on, for example, output signals of the vehicle speed sensor 420 or the operating condition of an ABS control.

The travel history acquisition means is only necessary to acquire a travel history of a vehicle. The travel history is only necessary to be defined such that guidance target points, at which the guidance target event to provide guidance to drivers of vehicles has occurred, and the tendency of the driving operation of the drivers of the vehicles can be determined. Consequently, it is only necessary that the travel history corresponding to the guidance target event is acquired. In a case in which an event relating to the behavior of vehicles is set as the guidance target event, a configuration of setting the behavior (vehicle speed, acceleration, etc., or the occurrence of control operation by ABS, TRC, etc.) at each position of the vehicles as the travel history may be adapted. In a case in which an event relating to the driving operations of drivers of vehicles is set as the guidance target event, a configuration of setting the driving operation (operation such as sudden braking, sudden steering, etc.) at each position of the vehicles as the travel history may be adapted. The travel history to determine the tendency of the driving operation may be defined as history of driving operation at each point, or history of the number of times the operation to be paid attention (sudden deceleration operation, etc.) was performed.

The guidance target point acquisition means is only necessary to acquire the guidance target points at which the guidance target event has occurred based on the travel history. That is, it is only necessary that the occurrence of a predetermined guidance target event is determined based on the travel history and the position is determined as the guidance target point based on the travel history. Events relating to behavior of vehicles, events relating to driving operation of drivers of vehicles, etc. are supposed as the guidance target event. As the former events, for example, sudden deceleration, sudden changes in acceleration in vehicles, and sudden changes in travel direction are supposed. As the latter events, for example, sudden braking operation or sudden steering operation, etc. by drivers are supposed. Note that the occurrence points of these events can be determined by the guidance target point acquisition means determining, based on the travel history, that an amount of changes in vehicle speed or an amount of changes in acceleration per reference unit (unit distance, unit time, etc.) is equal to or greater than a predetermined amount of change, or determining driving operations, etc. with an operation amount per reference unit that is equal to or greater a threshold value, and determining the corresponding points.

The operation tendency acquisition means is only necessary to acquire the tendency of the driving operation of the driver of the vehicle based on the travel history. That is, it is only necessary that the tendency of the driving operation of the driver of an arbitrary vehicle is acquired based on the travel history of the vehicle. Here, the tendency of the driving operation is only necessary to be an element to determine whether the guidance on the guidance target point is also useful for the driver of another vehicle if the guidance is provided. For example, it is only necessary that the tendency of the driving operation directly or indirectly indicates whether the driving operation relating to the guidance target event is likely to be performed.

The former case may include, for example, frequency in which the driving operation of the guidance target event is performed per reference unit (unit distance, unit time, etc.) or the like. The latter case may include, for example, the tendency of the driving technique of the driver. That is, in a case in which the guidance target event has occurred on the vehicle driven by a driver with a high driving technique, it is useful for many drivers that the guidance on the occurrence point of the guidance target event is provided. On the other hand, in a case in which the guidance target event has occurred on the vehicle driven by a driver with a low driving technique, it is not useful that the guidance on the occurrence point of the guidance target event is provided. The driving technique may be determined in various methods. A configuration of acquiring the tendency of the driving technique based on the occurrence frequency of the driving operation of which an operation amount per reference unit (unit distance, unit time, etc.) is equal to or greater than a threshold value, etc. may be adapted. As a matter of course, various kinds of operations may be assumed as the target operations for determining the operation amount such as a sudden braking operation, a sudden steering operation, operations leading to ABS control and TRC control, etc.

The guidance means is only necessary to be capable of determining whether to provide the guidance on the guidance target point based on the tendency of the driving operation and providing the guidance on the guidance target point for which it is determined to provide the guidance. That is, the guidance means is only necessary to be capable of assuming that the tendency of the driving operation corresponds to the usefulness of providing the guidance on the guidance target point, determining to provide the guidance in a case in which it is useful, and providing the guidance relating to the guidance target point for which it is determined to provide the guidance. The guidance is only necessary to be provided on vehicles in the vicinity of the guidance target point. It is only necessary to be configured that the guidance means provides control signals, information, etc. for causing guidance units of the vehicles to provide the guidance. Consequently, the guidance means may exist inside vehicles or outside vehicles (in such a case, the guidance units inside vehicles are controlled by network, etc.)

As a matter of course, here, it is only necessary to be capable of determining whether to provide the guidance using the tendency of the driving operation as an element for determination. Whether to provide the guidance may be determined based on the tendency of the driving operation and elements other than the tendency of the driving operation. In such a case, the probability at which it is determined that the guidance on the guidance target point is provided is only necessary to vary depending on the tendency of the driving operation. In addition, the tendency of the driving operation may change sequentially or in a stepped manner. When the tendency of the driving operation changes at two or more stages, the probability at which it is determined that the guidance on the guidance target point is provided varies depending on the tendency of the driving operation.

In addition, to provide the guidance relating to the guidance target point for which it is determined to provide the guidance, a configuration may be adapted in which a guidance target point to provide the guidance is determined from a plurality of guidance target points and the guidance relating to the guidance target point is provided. Alternatively, a configuration may be adapted in which only the guidance target points to provide the guidance are stored in a storage media and the guidance relating to the guidance target points stored in the storage media is provided.

In addition, a configuration may be adapted in which whether to provide the guidance on the guidance target point is determined in a case in which the guidance target points are concentrated in a narrow area based on the travel history of a plurality of vehicles. As such a configuration, for example, a configuration may be adapted in which the guidance target point acquisition means acquires a plurality of guidance target points existing in an area of a predetermined distance, the operation tendency acquisition means acquires an index indicating the tendency of the driving operation of the driver of the vehicle for each of the plurality of the guidance target points, and the guidance means determines whether to provide the guidance on the guidance target point based on the sum of indexes for the respective guidance target points That is, in a case in which a plurality of guidance target points exist in an area of a predetermined distance, it is highly likely to be useful to provide the guidance on the guidance target point and the usefulness normally increases as the number of guidance target points increases. However, the necessity of providing the guidance on the guidance target point may be low depending on the tendency of the driving operation of the driver of the vehicle. Therefore, it may be assumed that the necessity of providing the guidance is low for many of the plurality of guidance target points existing in the area of the predetermined distance. Thus, by acquiring an index indicating the tendency of the driving operation for each of the guidance target points and obtaining the sum of the indexes, it is possible to comprehensively determine whether it is useful to provide the guidance for the plurality of guidance target points existing in the area of the predetermined distance. As a result, the probability at which the guidance is provided in a case in which the guidance on the guidance target point is useful increases, and the probability at which the guidance is not provided in a case in which the guidance on the guidance target point is unuseful increases. Such a configuration may be realized by a configuration without the surrounding condition acquisition section 21*d* in the configuration shown in FIG. 1. In such a case, the determination of whether to provide the guidance on the guidance target point may be realized by comparing the sum of indexes indicating the tendency of the driving operation with a threshold value, etc.

In addition, the operation tendency acquisition means may be configured to acquire the tendency of the driving technique of the driver of the vehicle as the tendency of the driving operation and the guidance means may be configured to increase the probability at which it is determined to provide the guidance on the guidance target point as the tendency of the driving technique is higher. That is, the possibility of occurrence of the guidance target events such as a sudden deceleration, a sudden steering operation, etc. is lower as the tendency of the driving technique is higher. In a case in which the guidance target event has occurred with the driver with a high driving technique, many drivers are required to pay attention to the occurrence of the same guidance target event. Consequently, by increasing the probability at which it is determined to provide the guidance on the guidance target point as the tendency of the driving technique is higher, it is possible to provide information useful for many users and not to provide information useful for many drivers.

In addition, as a configuration to determine whether to provide the guidance using the tendency of the driving operation as an element for determination, the surrounding condition acquisition means for acquiring the surrounding condition of the vehicle may be further provided and the guidance means may be configured to determine whether to provide the guidance on the guidance target point based on the tendency of the driving operation and the surrounding condition. That is, in a case in which the surrounding condition of the vehicle is a special condition that can provoke the guidance target event, the guidance target event may not be likely to occur in a normal condition even when the guidance target event has occurred in such a special condition. Thus, by determining whether to provide the guidance on the guidance target point in consideration of the surrounding condition of the vehicle, it is possible to increase the probability at which the useful information is provided and increase the probability at which the unuseful information is not provided.

In addition, the surrounding condition acquisition means may be configured to acquire the traffic condition of the road travelled by the vehicle as the surrounding condition and the guidance means may be configured to increase the probability at which it is determined to provide the guidance on the guidance target point as the traffic condition is a condition easier to travel on the road. That is, the guidance target events such as the sudden deceleration, the sudden steering operation, etc. is less likely to occur as the traffic condition is the condition easier to travel on the road.

In a case in which the guidance target event has occurred in a traffic condition in which the guidance target event is less likely to occur, many drivers are required to pay attention to the occurrence of the same guidance target event. Consequently, by increasing the probability at which it is determined to provide the guidance on the guidance target point as the traffic condition is a condition easier to travel on the road, it is possible to configure such that the guidance on information useful for many drivers is provided and the guidance on information unuseful for many drivers is not provided. The condition easy to travel on the road may include a condition in which the operation load of the driver is small. For example, it may be assumed to be easier to travel as the congestion degree is lower and as there is no accident or construction.

In addition, the surrounding condition acquisition means may be configured to acquire the weather of surrounding of the vehicle as the surrounding condition and the guidance means may be configured to increase the probability at which it is determined to provide the guidance on the guidance target point when the weather is better.

In a case in which the guidance target event has occurred in weather in which the guidance target event is less likely to occur, many drivers are required to pay attention to the occurrence of the same guidance target event. Consequently, by increasing the probability at which it is determined to provide the guidance on the guidance target point as the weather is better, it is possible to configure such that the guidance on information useful for many drivers is provided and the guidance on information unuseful for many drivers is not provided. Whether the weather is good may be determined in accordance with the level of impact on the travel of the vehicle. A configuration may be adapted in which sunny and cloudy is assumed to be better weather than raining, and raining is assumed to be better than snowing and strong wind.

Further, the technique of determining whether to provide the guidance on the guidance target point based on the tendency of the driving operation can be applied to a program and a method. In addition, it can be supposed that the system, the program, and the method as mentioned above are realized as a single device, or realized with parts used in common by the respective components provided in the vehicle. Various kinds of modes are included. For example, information administration systems, navigation systems, methods, and programs provided with the systems as mentioned above can be supplied. Or, the structure can be changed as appropriate. For example, a part of the structure can be realized by software and another part by hardware. In addition, the functions can be practiced with a storage medium of a program that controls the system. Obviously, the storage medium of the software may be a magnetic storage medium or an optical storage medium. In addition, any storage medium to be developed in future can be applied in the same manner.

The invention claimed is:

1. A driving assistance system for a vehicle, the system comprising:
   a processor programmed to:
      receive information from a GPS receiver indicating a current position of the vehicle;
      acquire a travel history of the vehicle;
      acquire a first guidance target point at which a guidance target event has occurred based on the travel history, the guidance target event being an event relating to a behavior of the vehicle or an event relating to a driving operation of a driver of the vehicle;
      acquire a plurality of area guidance target points, including the first guidance target point, wherein the area guidance target points exist within a predetermined area and distance of the first guidance target point and wherein the plurality of area guidance target points acquired is greater than a predetermined number designated for the predetermined area;
      acquire a driving level index, wherein the driving level index indicates a tendency of a driving operation of a driver of the vehicle based on the travel history for each of the area guidance target points;
      acquire for each area guidance target point, a respective surrounding condition index, wherein each respective surrounding condition index indicates a current surrounding condition of each respective area guidance target point;
      calculate for each area guidance target point, an adjusted index, wherein the adjusted index is the product of the surrounding condition index of the respective area guidance target point and the driving level index of the respective area guidance target point;
      calculate the sum of the adjusted indexes of the area guidance target points; and
      determine to provide on a vehicle display the centroid of the area guidance target points only when the calculated sum of the adjusted indexes of the area guidance target points is greater than a predetermined threshold; and
      when the current position of the vehicle becomes closer to the guidance target point, provide guidance relating to the guidance target event for which it is determined to provide the guidance;
wherein the surrounding condition is at least one of a traffic condition, a weather condition, and a road shape condition.

2. The driving assistance system according to claim 1, wherein the processor is programmed to:
acquire a tendency of a driving technique of the driver of the vehicle as the tendency of the driving operation; and
increase a probability at which it is determined to provide the guidance on the guidance target event as the tendency of the driving technique is higher.

3. The driving assistance system according to claim 2, wherein the processor is programmed to:
acquire the tendency of the driving technique based on an occurrence frequency of the driving operation of which an operation amount per reference unit is equal to or greater than a threshold value.

4. The driving assistance system according to claim 1, wherein:
the surrounding condition is a traffic condition; and
the processor is programmed to increase a probability at which it is determined to provide the guidance on the guidance target event as the traffic condition is a condition easier to travel on the road.

5. The driving assistance system according to claim 1, wherein:
the surrounding condition is a weather condition; and
the processor is programmed to increase a probability at which it is determined to provide the guidance on the guidance target event as the weather is better.

6. The driving assistance system according to claim 1, wherein the processor is programmed to:
decrease a probability at which it is determined to provide the guidance on the guidance target event when a dynamic surrounding condition is special; and
increase the probability at which it is determined to provide the guidance on the guidance target event when a static surrounding condition is special.

7. The driving assistance system according to claim 1, wherein:
the surrounding condition is a road shape condition; and
the processor is programmed to increase a probability at which it is determined to provide the guidance on the guidance target event as a road shape indicated by the road shape condition causes a larger operation load to a driver.

8. A driving assistance method for a vehicle, the method comprising:
receiving information from a GPS receiver indicating a current position of the vehicle;
acquiring a travel history of the vehicle;
acquiring a first guidance target point at which a guidance target event has occurred based on the travel history, the guidance target event being an event relating to a behavior of the vehicle or an event relating to a driving operation of a driver of the vehicle;
acquiring a plurality of area guidance target points, including the first guidance target point, wherein the area guidance target points exist within a predetermined area and distance of the first guidance target point, and wherein the plurality of area guidance target points acquired is greater than a predetermined number designated for the predetermined area;
acquiring a driving level index, wherein the driving level index indicates a tendency of a driving operation of a driver of the vehicle based on the travel history for each of the area guidance target points;
acquiring for each area guidance target point, a respective surrounding condition index, wherein each respective surrounding condition index indicates a current surrounding condition of each respective area guidance target point;
calculating for each area guidance target point, an adjusted index, wherein the adjusted index is the product of the surrounding condition index of the respective area guidance target point and the driving level index of the respective area guidance target point;
calculating the sum of the adjusted indexes of the area guidance target points;
determining to provide on a vehicle display the centroid of the area guidance target points only when the calculated sum of the adjusted indexes of the area guidance target points is greater than a predetermined threshold; and
when the current position of the vehicle becomes closer to the guidance target point, providing guidance relating to the guidance target event for which it is determined to provide the guidance;
wherein the surrounding condition is at least one of a traffic condition, a weather condition, and a road shape condition.

9. A computer-readable storage medium storing a computer-executable driving assistance program for a vehicle, the program causing a computer to execute the following instructions:
receiving information from a GPS receiver indicating a current position of the vehicle;
acquiring a travel history of the vehicle;
acquiring a first guidance target point at which a guidance target event has occurred based on the travel history, the guidance target event being an event relating to a behavior of the vehicle or an event relating to a driving operation of a driver of the vehicle;
acquiring a plurality of area guidance target points, including the first guidance target point, wherein the area guidance target points exist within a predetermined area and distance of the first guidance target point, and wherein the plurality of area guidance target points acquired is greater than a predetermined number designated for the predetermined area;
acquiring a driving level index, wherein the driving level index indicates a tendency of a driving operation of a driver of the vehicle based on the travel history for each of the area guidance target points;
acquiring for each area guidance target point, a respective surrounding condition index, wherein each respective surrounding condition index indicates a current surrounding condition of each respective area guidance target point;
calculating for each area guidance target point, an adjusted index, wherein the adjusted index is the product of the surrounding condition index of the respective area guidance target point and the driving level index of the respective area guidance target point;
calculating the sum of the adjusted indexes of the area guidance target points;
determining to provide on a vehicle display the centroid of the area guidance target points only when the calculated sum of the adjusted indexes of the area guidance target points is greater than a predetermined threshold; and when the current position of the vehicle becomes closer to the guidance target point, providing guidance relating to the guidance target event for which it is determined to provide the guidance;

wherein the surrounding condition is at least one of a traffic condition, a weather condition, and a road shape condition.

* * * * *